US012216588B2

(12) United States Patent
Hyun et al.

(10) Patent No.: US 12,216,588 B2
(45) Date of Patent: Feb. 4, 2025

(54) SEMICONDUCTOR MEMORY APPARATUS, MEMORY MODULE, AND MEMORY SYSTEM INCLUDING MEMORY MODULE

(71) Applicant: SK hynix Inc., Icheon-si (KR)

(72) Inventors: Sung Woo Hyun, Icheon-si (KR); Hyeong Tak Ji, Icheon-si (KR); Myoung Seo Kim, Icheon-si (KR); Jae Hoon Kim, Icheon-si (KR); Eui Cheol Lim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 57 days.

(21) Appl. No.: 17/543,481

(22) Filed: Dec. 6, 2021

(65) Prior Publication Data

US 2022/0188243 A1  Jun. 16, 2022

Related U.S. Application Data

(60) Provisional application No. 63/124,245, filed on Dec. 11, 2020.

(30) Foreign Application Priority Data

Oct. 25, 2021  (KR) .................. 10-2021-0142969

(51) Int. Cl.
  *G06F 12/10*  (2016.01)
(52) U.S. Cl.
  CPC .................. *G06F 12/10* (2013.01)
(58) Field of Classification Search
  CPC ............ G06F 12/02; G06F 12/0646; G06F 2212/1016; G06F 12/0246; G06F 12/10

USPC .......... 711/200, 202, 103, 206, E12.008, 711/E12.061, E12.003, 219, E12.001, 210
See application file for complete search history.

(56) References Cited

U.S. PATENT DOCUMENTS

| | | | | |
|---|---|---|---|---|
| 5,488,707 | A * | 1/1996 | Phillips | G06F 9/30032 712/E9.034 |
| 5,860,148 | A * | 1/1999 | Bergantino | H04Q 11/0478 711/209 |
| 2004/0078544 | A1 | 4/2004 | Lee et al. | |
| 2009/0168505 | A1 * | 7/2009 | Hanzawa | G11C 13/0069 365/230.02 |
| 2009/0198924 | A1 * | 8/2009 | Shaeffer | G11C 11/4076 711/E12.001 |
| 2010/0231940 | A1 * | 9/2010 | Kaima | H04N 1/409 358/1.9 |
| 2012/0239903 | A1 | 9/2012 | Kim et al. | |
| 2015/0220445 | A1 * | 8/2015 | Stark | G06F 9/467 711/156 |

(Continued)

*Primary Examiner* — Gautam Sain
*Assistant Examiner* — Edward Waddy, Jr.
(74) *Attorney, Agent, or Firm* — William Park & Associates Ltd.

(57) ABSTRACT

A memory module may include J memory chips configured to input/output data in response to each of a plurality of translated address signals; and an address remapping circuit configured to generate a plurality of preliminary translated address signals by adding first correction values to a target address signal provided from an exterior of the memory module, and to generate the plurality of translated address signals by shifting all bits of each of the plurality of preliminary translated address signals so that K bits included in a bit string of each of the plurality of preliminary translated address signals are moved to other positions of each bit string.

17 Claims, 7 Drawing Sheets

(56) References Cited

U.S. PATENT DOCUMENTS

| | | | |
|---|---|---|---|
| 2016/0162217 A1* | 6/2016 | Song | G06F 3/0683 |
| | | | 711/202 |
| 2018/0294784 A1 | 10/2018 | Kim et al. | |
| 2019/0065145 A1* | 2/2019 | Robinson | G06F 5/01 |

* cited by examiner

SEMICONDUCTOR MEMORY APPARATUS, MEMORY MODULE, AND MEMORY SYSTEM INCLUDING MEMORY MODULE

CROSS-REFERENCES TO RELATED APPLICATION

The present application claims the benefit under 35 U.S.C. § 119(e) of U.S. provisional application No. 63/124,245, filed on Dec. 11, 2020, and claims the priority under 35 U.S.C. § 119(a) of Korean application number 10-2021-0142969, filed on Oct. 25, 2021, in the Korean Intellectual Property Office, which is incorporated herein by reference in its entirety as set forth in full.

BACKGROUND

1. Technical Field

Various embodiments generally relate to a semiconductor apparatus, and particularly, to a semiconductor memory apparatus, a memory module, and a memory system including the memory module.

2. Related Art

A semiconductor apparatus, for example, a volatile memory apparatus such as a dynamic random access memory (DRAM) determines data on the basis of charge stored in a capacitor. However, since the charge stored in the capacitor may be leaked in various forms over time, a volatile memory apparatus periodically performs a refresh operation. As the manufacturing process of manufacturing a memory apparatus is scaled down and the spacing between word lines is gradually narrowed, an influence on charges of memory cells connected to adjacent word lines increases due to a voltage distribution of one word line, and when one word line is intensively accessed, a data loss caused by a row hammer phenomenon occurs in which data stored in memory cells connected to adjacent word lines is lost when a voltage of one word line in an activated state.

FIG. 1 is a diagram for explaining a row hammer phenomenon in a general semiconductor memory module.

FIG. 1 illustrates a memory module including a plurality of memory chips CHIP0 to CHIPn−1. Each of the plurality of memory chips CHIP0 to CHIPn−1 includes a plurality of row lines, for example, a plurality of word lines ROW0 to ROWk+1. A word line (for example, ROW1) having substantially the same sequence number is selected from each of the plurality of memory chips CHIP0 to CHIPn−1 according to a row address signal provided the outside of the memory module. An operation of accessing the word lines ROW1 of the plurality of memory chips CHIP0 to CHIPn−1 is repeated, which causes a row hammer phenomenon in which charges of memory cells connected to adjacent word lines ROW0 and ROW2 are affected. A currently accessed word line may be referred to as an aggressor row. Word lines that are attacked from the aggressor row, that is, word lines, which are physically adjacent to the aggressor row and lose data due to activation of the aggressor row, may be referred to as victim rows. In the aforementioned example, the word line ROW1 is an aggressor row and the word lines ROW0 and ROW2 adjacent to the word line ROW1 are victim rows. In such a case, for convenience of description, it is assumed that the victim rows are two word lines adjacent to the aggressor row, but as the distance between word lines decreases, the number of victim rows increases.

SUMMARY

A memory module according to an embodiment of the present disclosure may include: J memory chips configured to input/output data in response to each of a plurality of translated address signals; and an address remapping circuit configured to generate a plurality of preliminary translated address signals by adding first correction values to a target address signal provided from an exterior of the memory module, and to generate the plurality of translated address signals by shifting all bits of each of the plurality of preliminary translated address signals so that K bits included in a bit string of each of the plurality of preliminary translated address signals are moved to other positions of each bit string.

A memory module according to an embodiment of the present disclosure may include: J memory chips each including a plurality of unit memory areas and configured to input/output data by accessing unit memory areas having sequence numbers, which do not overlap each other among the plurality of unit memory areas, in response to each of a plurality of translated address signals; and an address remapping circuit configured to generate a plurality of preliminary translated address signals by adding first correction values to a row address signal included in a target address signal provided from an exterior of the memory module, to shift all bits of each of the plurality of preliminary translated address signals so that K bits included in a bit string of each of the plurality of preliminary translated address signals are moved to other positions of each bit string, and to generate the plurality of translated address signals by adding second correction values to a unit area address included in the target address signal.

A memory system according to an embodiment of the present disclosure may include: a memory controller configured to generate a plurality of preliminary translated address signals by adding correction values to a target address signal, and to generate a plurality of translated address signals by shifting all bits of each of the plurality of preliminary translated address signals so that K bits included in a bit string of each of the plurality of preliminary translated address signals are moved to other positions of each bit string; and a memory module including J memory chips, configured to receive the plurality of translated address signals, and configured so that the J memory chips perform data input/output with the memory controller in response to each of the plurality of translated address signals.

A memory system according to an embodiment of the present disclosure may include: a memory controller configured to generate a plurality of preliminary translated address signals by adding first correction values to a row address signal included in a target address signal, to shift all bits of each of the plurality of preliminary translated address signals so that K bits included in a bit string of each of the plurality of preliminary translated address signals are moved to other positions of each bit string, and to generate the plurality of translated address signals by adding second correction values to a unit area address included in the target address signal; and a memory module including J memory chips each including a plurality of unit memory areas, and configured so that the J memory chips perform data input/output with the memory controller by accessing unit memory areas having sequence numbers, which do not overlap each other among the plurality of unit memory areas, in response to each of the plurality of translated address signals.

A semiconductor memory apparatus according to an embodiment of the present disclosure may include: a memory area including J unit memory areas; a control circuit configured to generate a plurality of translated address signals by remapping a target address signal provided from an exterior of the memory module, and to output any one translated address signal corresponding to a unit area address included in the target address signal among the plurality of translated address signals; and an address decoder configured to decode the any one translated address signal and access the memory area according to a decoding result.

DETAILED DESCRIPTION

Hereinafter, embodiments of the present disclosure will be described in more detail with reference to the accompanying drawings.

Various embodiments are directed to providing a semiconductor memory apparatus capable of minimizing data loss caused by row hammer, a memory module, and a memory system including the memory module. The data loss caused by a row hammer phenomenon occurs in which data stored in memory cells connected to adjacent word lines is lost when a voltage of one word line in an activated state.

In some embodiments, data loss caused by row hammer is minimized.

Figure 1:
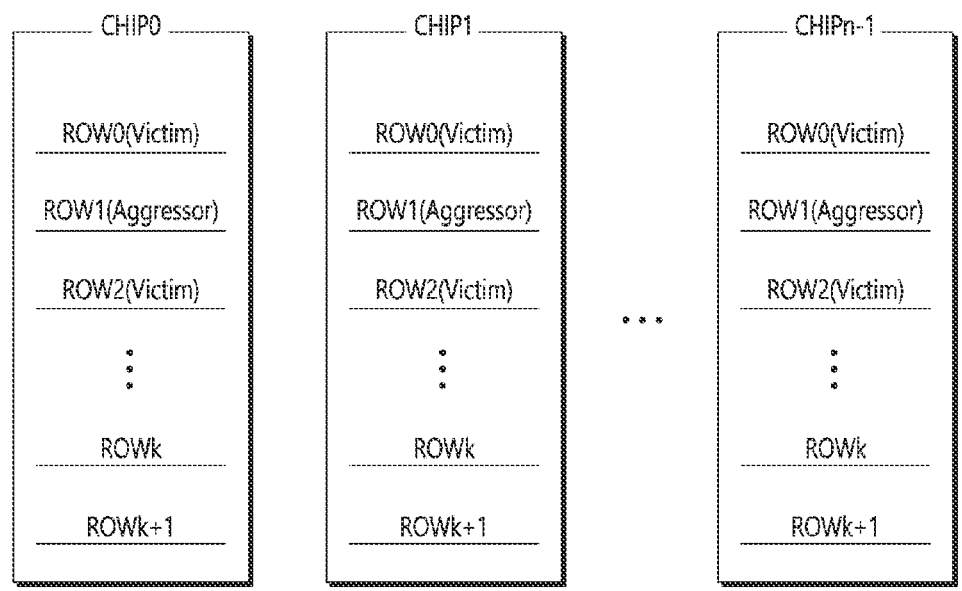
FIG. 1 is a diagram illustrating a row access method of a general semiconductor memory module.
Figure 2:
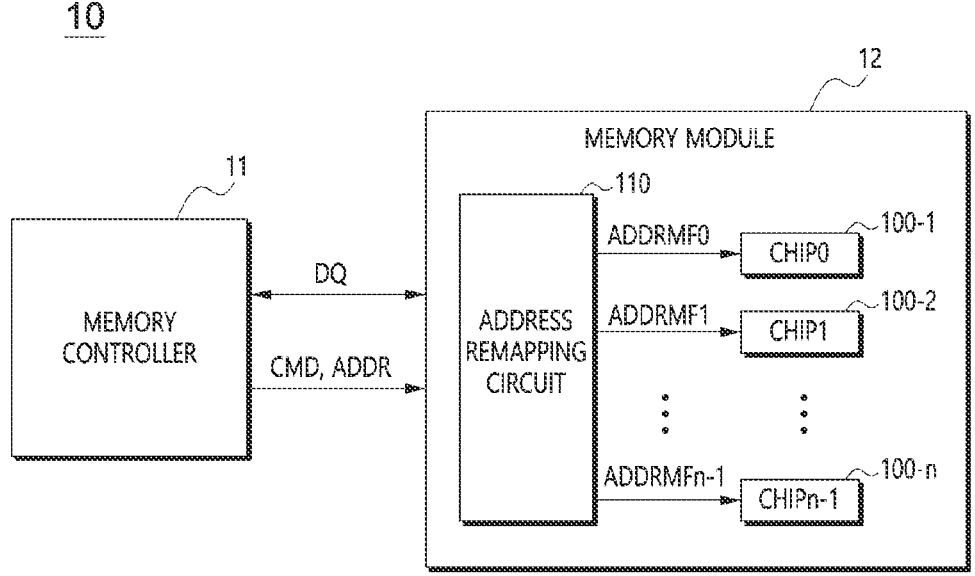
FIG. 2 is a diagram illustrating a configuration of a memory system 10 in accordance with an embodiment of the present disclosure.

FIG. 2 is a diagram illustrating a configuration of a memory system 10 in accordance with an embodiment of the present disclosure.

Referring to FIG. 2, the memory system 10 may include a memory controller 11 and a memory module 12.

The memory controller 11 may provide a command signal CMD and a target address signal ADDR to the memory module 12. The memory controller 11 may generate the target address signal ADDR by mapping a physical address signal, which is provided from an external host, for example, a central processing unit (CPU) or a graphics processing unit (GPU), into a form suitable for memory access. The target address signal ADDR may include address signals (for example, a row address signal, a column address signal, and a bank address signal) for selecting a row line, a column line, and a unit memory block of a semiconductor memory.

The memory module 12 may be a dual in-line memory module (hereinafter, DIMM) or a memory module having a 3D structure in which memory dies are stacked. The memory module 12 may perform input/output of data DQ with the memory controller 11 in response to the command signal CMD and the target address signal ADDR. The memory module 12 may include a plurality of memory chips CHIP0 to CHIPn−1 (100-1 to 100-$n$) and an address remapping circuit 110. The memory module 12 may access the plurality of memory chips 100-1 to 100-$n$ according to a plurality of translated address signals ADDRMF<0:n−1> generated by remapping the row address signal included in the target address signal ADDR. The plurality of translated address signals ADDRMF<0:n−1> may have values that satisfy a first condition that the sequence numbers of row lines (for example, word lines) accessed in each of the plurality of memory chips 100-1 to 100-$n$ do not overlap each other, and a second condition that the sequence numbers of victim rows, among the row lines accessed in each of the plurality of memory chips 100-1 to 100-$n$, do not overlap those of adjacent memory chips. The plurality of translated address signals ADDRMF<0:n−1> may include address signals generated by remapping the row address signal, and the column address signal and the bank address signal included in the target address signal ADDR.

The plurality of memory chips 100-1 to 100-$n$ may have substantially the same configuration. The plurality of memory chips 100-1 to 100-$n$ may be configured to access corresponding row lines in response to the plurality of translated address signals ADDRMF<0:n−1>, respectively.

The address remapping circuit 110 may include a remapping logic for remapping the target address signal ADDR so that the target address signal ADDR satisfies the first condition and the second condition. In an embodiment, the address remapping circuit 110 may receive a target address signal ADDR from an exterior of the address remapping circuit 110. In an embodiment, the address remapping circuit 110 may receive a target address signal ADDR from an exterior of the memory module 12 and from, for example but not limited to, the memory controller 11. An operation method of the address remapping circuit 110 will be described with reference to FIG. 4 and FIG. 5.

Figure 3:
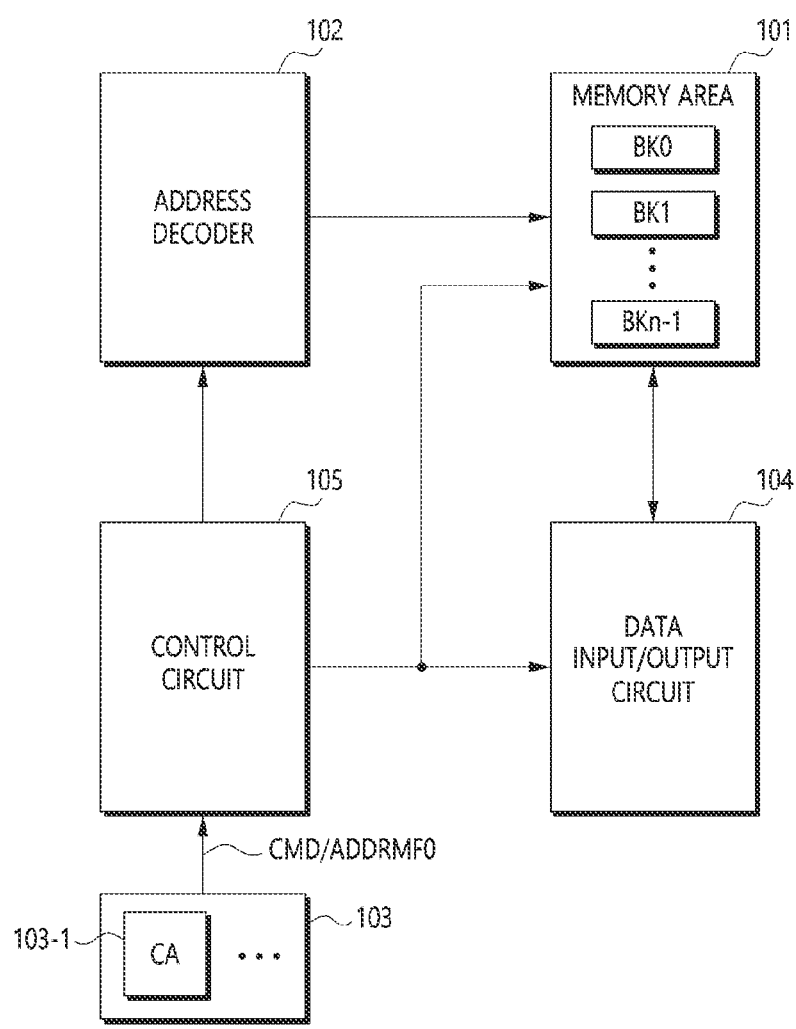
FIG. 3 is a diagram illustrating a configuration of a memory chip 100-1 in accordance with the embodiment of the present disclosure.

FIG. 3 is a diagram illustrating a configuration of the memory chip 100-1 in accordance with the embodiment of the present disclosure.

Referring to FIG. 3, the memory chip 100-1 in accordance with the embodiment of the present disclosure may include a memory area 101, an address decoder 102, a pin array 103, a data input/output circuit 104, and a control circuit 105.

The memory area 101 may include a plurality of memory cells, and the plurality of memory cells may include at least one of a volatile memory and a nonvolatile memory. Examples of the volatile memory may include a static RAM (SRAM), a dynamic RAM (DRAM), and a synchronous DRAM (SDRAM), and examples of the nonvolatile memory may include a read only memory (ROM), a programmable ROM (PROM), an electrically erasable and programmable ROM (EEPROM), an electrically programmable ROM (EPROM), a flash memory, a phase-change RAM (PRAM), a magnetic RAM (MRAM), a resistive RAM (ReRAM), a ferroelectric RAM (FRAM), and the like. During a read operation of the memory chip 100-1, data stored in the memory area 101 is output, and during a write operation of the memory chip 100-1, data input from the memory controller 11 may be stored in the memory area 101. The memory cells of the memory area 101 may be divided into a plurality of unit memory areas, for example, a plurality of memory banks BK0 to BKn−1.

The address decoder 102 may be connected to the control circuit 105 and the memory area 101. The address decoder 102 may decode an address signal provided from the control circuit 105, and access the memory area 101 according to the decoding result.

The pin array 103 may include a command and address integration pin (CA) 103-1. The command signal CMD and the translated address signal ADDRMF0 may be sequentially input through the command and address integration pin (CA) 103-1 at a predetermined timing. The word "predetermined" as used herein with respect to a parameter, such as a predetermined timing, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The data input/output circuit 104 may be connected to the memory area 101. The data input/output circuit 104 may exchange data with the memory controller 11 or the memory area 101. The data input/output circuit 104 may include a data input buffer, a data output buffer, a data input/output pad, and the like.

The control circuit 105 may be connected to the memory area 101, the address decoder 102, and the data input/output circuit 104. The control circuit 105 may perform a control operation related to the read operation, the write operation, and the address processing of the memory chip 100-1. The control circuit 105 may receive the command signal CMD and the translated address signal ADDRMF0 through the command and address integration pin (CA) 103-1.

Figure 4:
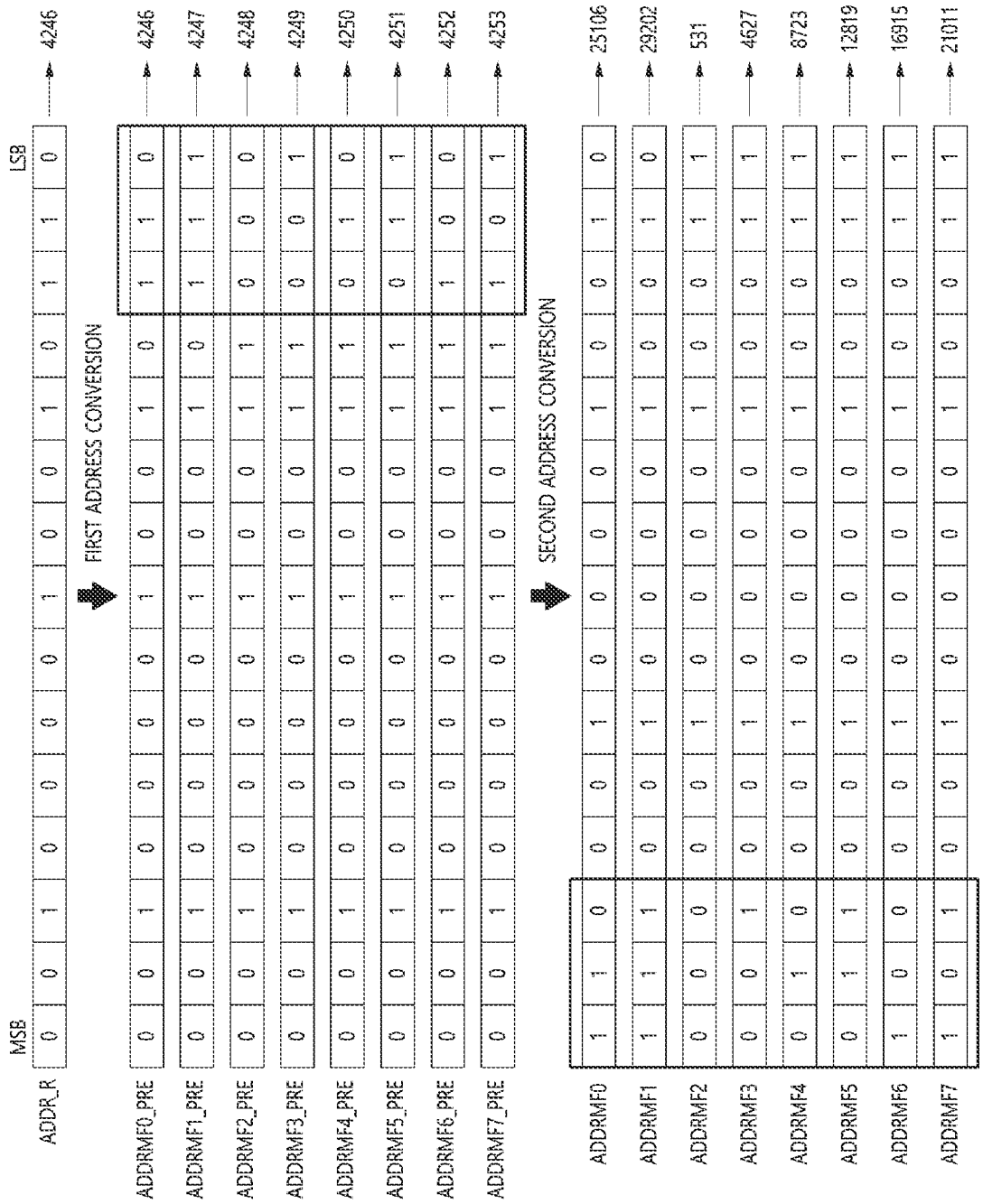
FIG. 4 is a diagram illustrating an example of an address remapping method in accordance with the embodiment of the present disclosure.

FIG. 4 is a diagram illustrating an example of an address remapping method in accordance with the embodiment of the present disclosure.

The address remapping circuit 110 may generate the plurality of translated address signals ADDRMF<0:n−1> by performing address remapping on the target address signal ADDR through a first address conversion operation based on the first condition and a second address conversion operation based on the second condition. The first condition is that the sequence numbers of row lines accessed by the plurality of translated address signals ADDRMF<0:n−1> among the row lines of each of the plurality of memory chips 100-1 to 100-n do not overlap each other. The second condition is that the sequence numbers of victim rows, among the row lines accessed by the plurality of translated address signals ADDRMF<0:n−1> among the row lines of each of the plurality of memory chips 100-1 to 100-n, do not overlap those of adjacent memory chips.

The address remapping circuit 110 may perform the first address conversion operation on a row address signal ADDR_R included in the target address signal ADDR so that the target address signal ADDR satisfies the first condition. The address remapping circuit 110 may perform the first address conversion operation by adding first correction values, for example, 0 to n−1 corresponding to the number of the plurality of memory chips 100-1 to 100-n, to the row address signal ADDR_R one by one, as one of conversion methods by which the first condition is satisfied. The address signals generated according to the first address conversion operation are referred to as a plurality of preliminary translated address signals ADDRMF<0:n−1>_PRE. The address remapping circuit 110 may perform the second address conversion operation of shifting all bits of each of the plurality of preliminary translated address signals ADDRMF<0:n−1>_PRE, as one of conversion methods by which the second condition is satisfied, so that 'K' least significant bits (LSBs) are moved to the positions of most significant bits (MSBs). The address signals generated according to the second address conversion operation are referred to as a plurality of translated address signals ADDRMF<0:n−1>.

In such a case, 'K' may be determined by Log 2[Max(I, J)]. The above 'I' is a value set to ensure the reliability of an access operation of a memory chip, and may be, for example, a distance affected by row hammer, that is, the total number of victim rows adjacent to an aggressor row. The above 'J' is the number of memory chips in a memory module.

FIG. 4 illustrates an example of an address remapping method when I=6, J=8, and the value of the row address signal ADDR_R is '4246(001000010010110)'. Referring to FIG. 4, by performing the first address conversion operation of adding each of first correction values 0 to 7 to the row address signal ADDR_R, the plurality of preliminary translated address signals ADDRMF<0:n−1>_PRE may have different values.

The preliminary translated address signal ADDRMF0_PRE corresponding to the first memory chip 100-1 may be translated into '4246(001000010010110)' by adding '0' to '4246(001000010010110)'. The preliminary translated address signal ADDRMF1_PRE corresponding to the second memory chip 100-2 may be translated into '4247(001000010010111)' by adding '1' to '4246 (001000010010110)'. The preliminary translated address signal ADDRMF0_PRE corresponding to the third memory chip 100-3 may be translated into '4248 (001000010011000)' by adding '2' to '4246 (001000010010110)'. The preliminary translated address signal ADDRMF3_PRE corresponding to the fourth memory chip 100-4 may be translated into '4249 (001000010011001)' by adding '3' to '4246 (001000010010110)'. The preliminary translated address signal ADDRMF4_PRE corresponding to the fifth memory chip 100-5 may be translated into '4250 (001000010011010)' by adding '4' to '4246 (001000010010110)'. The preliminary translated address signal ADDRMF5_PRE corresponding to the sixth memory chip 100-6 may be translated into '4251 (001000010011011)' by adding '5' to '4246 (001000010010110)'. The preliminary translated address signal ADDRMF6_PRE corresponding to the seventh memory chip 100-7 may be translated into '4252 (001000010011100)' by adding '6' to '4246 (001000010010110)'. The preliminary translated address signal ADDRMF7_PRE corresponding to the eighth memory chip 100-8 may be translated into '4253 (001000010011101)' by adding '7' to '4246 (001000010010110)'.

Since K=Log 2[Max(6, 8)]=Log 2[8]=3 with respect to the plurality of preliminary translated address signals ADDRMF<0:n−1>_PRE, the second address conversion operation is performed to shift three LSBs to the positions of MSBs, so that the sequence numbers of victim rows, among row lines accessed by the plurality of translated address signals ADDRMF<0:7>, may be substantially prevented from overlapping adjacent memory chips.

The translated address signal ADDRMF0 corresponding to the first memory chip 100-1 may be translated into '25106(110001000010010)' by shifting three LSB digits of '4246(001000010010110)' to three MSB digits. The translated address signal ADDRMF1 corresponding to the second memory chip 100-2 may be translated into '29202 (111001000010010)' by shifting three LSB digits of '4247 (001000010010111)' to three MSB digits. The translated address signal ADDRMF2 corresponding to the third memory chip 100-3 may be translated into '531 (000000010011001)' by shifting three LSB digits of '4248 (001000010011000)' to three MSB digits. The translated address signal ADDRMF3 corresponding to the fourth memory chip 100-4 may be translated into '4627 (001001000010011)' by shifting three LSB digits of '4249 (001000010011001)' to three MSB digits. The translated address signal ADDRMF4 corresponding to the fifth memory chip 100-5 may be translated into '8723 (010001000010011)' by shifting three LSB digits of '4250 (001000010011010)' to three MSB digits. The translated address signal ADDRMF5 corresponding to the sixth memory chip 100-6 may be translated into '12819 (011001000010011)' by shifting three LSB digits of '4251 (001000010011011)' to three MSB digits. The translated address signal ADDRMF6 corresponding to the seventh memory chip 100-7 may be translated into '16915 (100001000010011)' by shifting three LSB digits of '4252 (001000010011100)' to three MSB digits. The translated address signal ADDRMF7 corresponding to the eighth memory chip 100-8 may be translated into '21011 (101001000010011)' by shifting three LSB digits of '4253 (001000010011101)' to three MSB digits.

Although FIG. 4 illustrates only address bits corresponding to the row address signal ADDR_R for convenience of description, the plurality of preliminary translated address signals ADDRMF<0:n−1>_PRE or/and the plurality of translated address signals ADDRMF<0:n−1> may further include a column address signal and a bank address signal.

Figure 5:
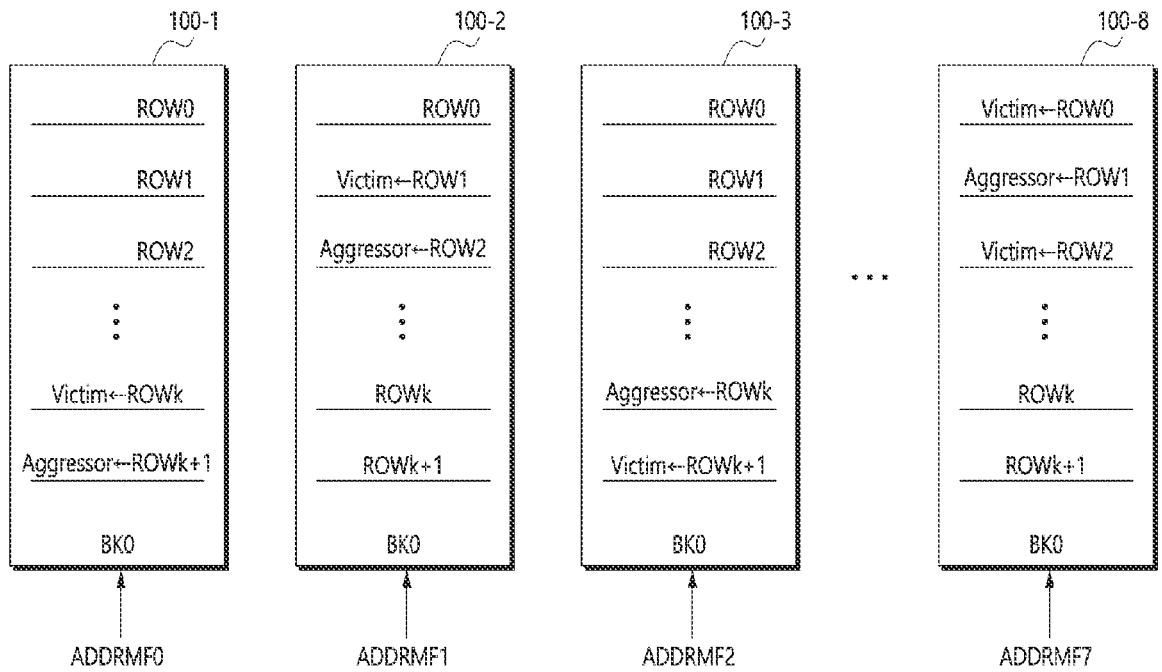
FIG. 5 is a diagram illustrating an access method of a memory module 12 in accordance with the embodiment of the present disclosure.

FIG. 5 is a diagram illustrating an access method of the memory module 12 in accordance with the embodiment of the present disclosure.

In the plurality of memory chips 100-1 to 100-n of the memory module 12, row lines of unit memory blocks having substantially the same sequence numbers may be accessed by the plurality of translated address signals ADDRMF<0: n−1> generated by the address remapping circuit 110 that performs the address remapping operation as illustrated in FIG. 4.

FIG. 5 illustrates an example of an access method when the number of the plurality of memory chips 100-1 to 100-n is 8.

Referring to FIG. 5, in the first memory chip 100-1, the row line ROWk+1 of the first memory bank BK0 may be accessed by the translated address signal ADDRMF0, an aggressor row may be ROWk+1, and a victim row may be ROWk. In the second memory chip 100-2, the row line ROW2 of the first memory bank BK0 may be accessed by the translated address signal ADDRMF1, an aggressor row may be ROW2, and victim rows may be ROW1 and ROW3. In the third memory chip 100-3, the row line ROWk of the first memory bank BK0 may be accessed by the translated address signal ADDRMF2, an aggressor row may be ROWk, and victim rows may be ROWk−1 and ROWk+1. In the eighth memory chip 100-8, the row line ROW1 of the first memory bank BK0 may be accessed by the translated address signal ADDRMF7, an aggressor row may be ROW1, and victim rows may be ROW0 and ROW2. Accordingly, the first condition may be satisfied because the sequence numbers of the row lines accessed by the plurality of translated address signals ADDRMF<0:7>, among the row lines of each of the plurality of memory chips 100-1 to 100-8, do not overlap each other. Furthermore, the second condition may be satisfied because the sequence numbers of victim rows, among the row lines accessed by the plurality of translated address signals ADDRMF<0:7> among the row lines of each of the plurality of memory chips 100-1 to 100-8, do not overlap those of adjacent memory chips. For example, the second memory chip 100-2 is adjacent to the first memory chip 100-1 and the third memory chip 100-3 making the first and third memory chips adjacent memory chips. Too this, for example, the victim row ROW1 of the second memory chip 100-2 does not overlap with the victim row ROWk of the first memory chip 100-1 (i.e., the adjacent memory chip) or the victim row ROWk+1 of the third memory chip 100-3 (i.e., the other adjacent memory chip) satisfying the second condition.

Figure 6:
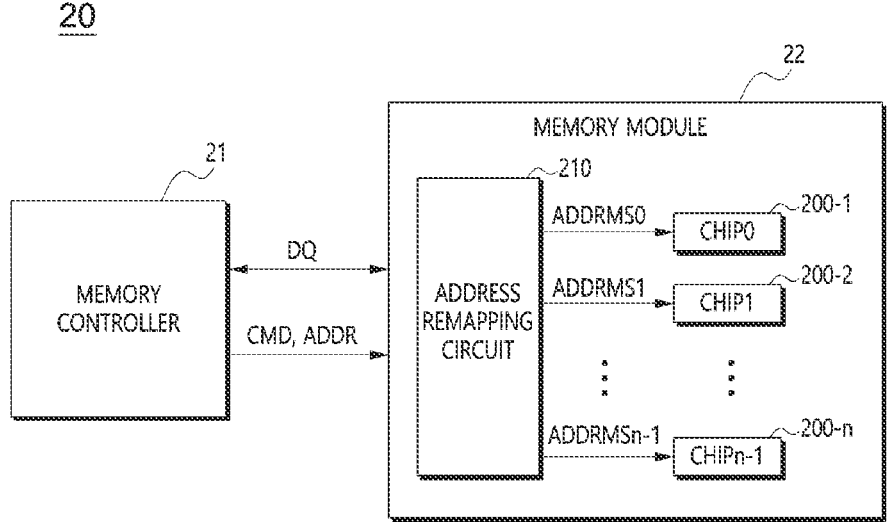
FIG. 6 is a diagram illustrating a configuration of a memory system 20 in accordance with another embodiment of the present disclosure.

FIG. 6 is a diagram illustrating a configuration of a memory system 20 in accordance with another embodiment of the present disclosure.

Referring to FIG. 6, the memory system 20 may include a memory controller 21 and a memory module 22.

The memory controller 21 may provide a command signal CMD and a target address signal ADDR to the memory module 22. The memory controller 21 may generate the target address signal ADDR by mapping a physical address signal, which is provided from an external host, for example, a CPU or a GPU, into a form suitable for memory access.

The memory module 22 may be a DIMM or a memory module having a 3D structure in which memory dies are stacked. The memory module 22 may perform input/output of data DQ with the memory controller 21 in response to the command signal CMD and the target address signal ADDR. The memory module 22 may include a plurality of memory chips CHIP0 to CHIPn−1 (200-1 to 200-n) and an address remapping circuit 210. The memory module 22 may access the plurality of memory chips 200-1 to 200-n according to a plurality of translated address signals ADDRMS<0:n−1> generated by remapping a row address signal and a bank address signal included in the target address signal ADDR. The plurality of translated address signals ADDRMS<0:n−1> may have values that satisfy a first condition for substantially preventing the sequence numbers of row lines (for example, word lines) accessed in each of the plurality of memory chips 200-1 to 200-n from overlapping each other, a second condition for substantially preventing the sequence numbers of victim rows, among the row lines accessed in each of the plurality of memory chips 200-1 to 200-n, from overlapping those of adjacent memory chips, and a third condition for substantially preventing the sequence numbers of unit memory areas (for example, memory banks) accessed in each of the plurality of memory chips 200-1 to 200-n from overlapping each other. The plurality of translated address signals ADDRMS<0:n−1> may include address signals generated by remapping the row address signal, address signals generated by remapping the bank address signal, and the column address signal included in the target address signal ADDR.

The plurality of memory chips 200-1 to 200-n may have substantially the same configuration. Each of the plurality of memory chips 200-1 to 200-n may have substantially the same configuration as the first memory chip 100-1 of FIG. 3. The plurality of memory chips 200-1 to 200-n may be configured to access corresponding row lines of corresponding unit memory areas in response to the plurality of translated address signals ADDRMS<0:n−1>, respectively.

The address remapping circuit 210 may include a remapping logic for remapping the target address signal ADDR so that the target address signal ADDR satisfies the first condition, the second condition, and the third condition. The logic configuration of the address remapping circuit 210 for remapping the target address signal ADDR so that the target address signal ADDR satisfies the first condition and the second condition may be substantially the same as the remapping logic of the address remapping circuit 110 described with reference to FIG. 2 and FIG. 4.

The address remapping circuit 210 may perform a first address conversion operation of adding each of first correction values 0 to 7 to a row address signal ADDR_R included in the target address signal ADDR. The address remapping circuit 210 may perform the second address conversion operation on each of address signals generated according to the result of the first address conversion operation. The address remapping circuit 210 may perform a third address conversion operation of adding each of second correction values to a unit area address included in the target address signal ADDR, for example, the bank address signal, separately from the first address conversion operation and the second address conversion operation. The second correction values may be substantially the same as the first correction values. By performing the third address conversion operation, an address remapping operation may be performed to satisfy the third condition for the sequence numbers of memory banks accessed in each of the plurality of memory chips 200-1 to 200-n do not overlap each other. A plurality of preliminary translated address signals may be generated by the first address conversion operation and the third address conversion operation. The plurality of translated address signals ADDRMS<0:n−1> may be generated by the second address conversion operation.

Figure 7:
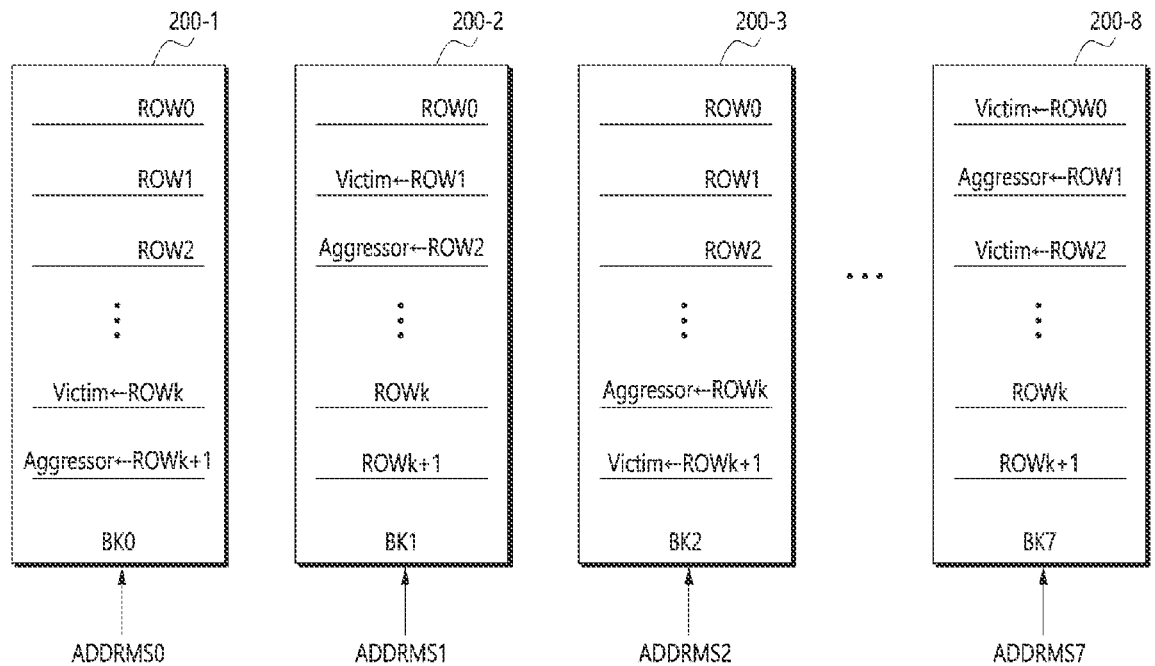
FIG. 7 is a diagram illustrating an access method of a memory module 22 in accordance with the another embodiment of the present disclosure.

FIG. 7 is a diagram illustrating an access method of the memory module 22 in accordance with the another embodiment of the present disclosure.

In the plurality of memory chips 200-1 to 200-n of the memory module 22, unit memory areas and row lines corresponding to the plurality of translated address signals ADDRMS<0:n−1> provided by the address remapping circuit 210 may be accessed.

FIG. 7 illustrates an access method when the number of the plurality of memory chips 200-1 to 200-n is 8 and the number of unit memory blocks included in each of the plurality of memory chips 200-1 to 200-n, for example, memory banks, is 8.

Referring to FIG. 7, in the first memory chip 200-1, the row line ROWk+1 of the first memory bank BK0 may be accessed by the translated address signal ADDRMS0, an aggressor row may be ROWk+1, and a victim row may be ROWk. In the second memory chip 200-2, the row line ROW2 of the second memory bank BK1 may be accessed by the translated address signal ADDRMS1, an aggressor row may be ROW2, and victim rows may be ROW1 and ROW3. In the third memory chip 200-3, the row line ROWk of the third memory bank BK2 may be accessed by the translated address signal ADDRMS2, an aggressor row may be ROWk, and victim rows may be ROWk−1 and ROWk+1. In the eighth memory chip 200-8, the row line ROW1 of the eighth memory bank BK7 may be accessed by the translated address signal ADDRMS7, an aggressor row may be ROW1, and victim rows may be ROW0 and ROW2. As can be seen from the example of the aforementioned access method, the first condition may be satisfied because the sequence numbers of row lines accessed by the plurality of translated address signals ADDRMS<0:7>, among row lines of each of the plurality of memory chips 200-1 to 200-8, do not overlap each other. The second condition may be satisfied because the sequence numbers of victim rows, among the row lines accessed by the plurality of translated address signals ADDRMS<0:7> among the row lines of each of the plurality of memory chips 200-1 to 200-8, do not overlap adjacent memory chips. Furthermore, the third condition may be satisfied because the sequence numbers of memory banks accessed in each of the plurality of memory chips 200-1 to 200-n do not overlap each other.

Figure 8:
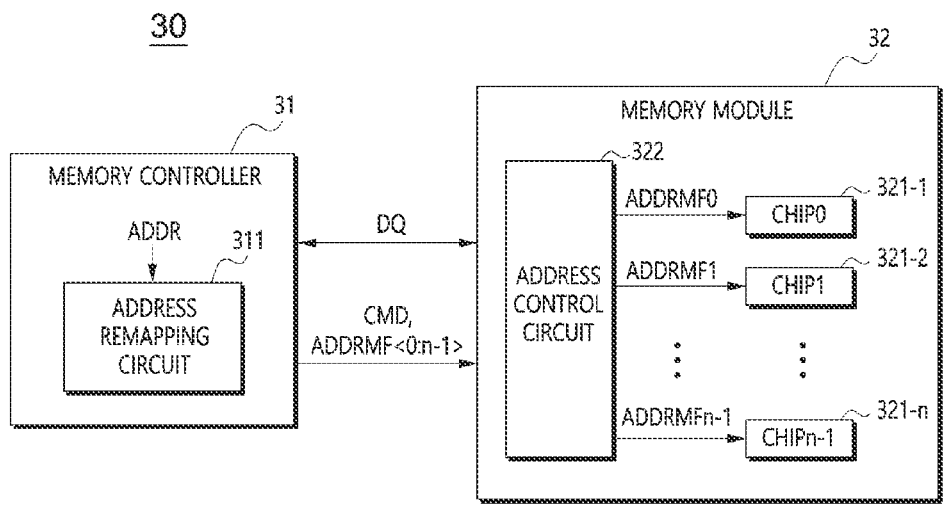
FIG. 8 is a diagram illustrating a configuration of a memory system 30 in accordance with still another embodiment of the present disclosure.

FIG. 8 is a diagram illustrating a configuration of a memory system 30 in accordance with still another embodiment of the present disclosure.

Referring to FIG. 8, the memory system 30 may include a memory controller 31 and a memory module 32.

The memory controller 31 may provide a command signal CMD and a plurality of translated address signals ADDRMF<0:n−1> to the memory module 32. The memory controller 31 may generate a target address signal ADDR by mapping a physical address signal, which is provided from an external host, for example, a CPU or a GPU, into a form suitable for memory access, and generate the plurality of translated address signals ADDRMF<0:n−1> by performing an address remapping operation on a row address signal included in the target address signal ADDR. The target address signal ADDR may include address signals (for example, a row address signal, a column address signal, and a bank address signal) for selecting a row line, a column line, and a unit memory block of a semiconductor memory. The plurality of translated address signals ADDRMF<0:n−1> may include address signals generated by performing a remapping operation on the row address signal, the column address signal, and the bank address signal.

The memory controller 31 may include an address remapping circuit 311. The address remapping circuit 311 may generate the plurality of translated address signals ADDRMF<0:n−1> by performing an address remapping operation on the target address signal ADDR. The logic configuration of the address remapping circuit 311 may be substantially the same as the remapping logic of the address remapping circuit 110 described with reference to FIG. 2 and FIG. 4. The memory controller 31 may be configured to sequentially transmit the plurality of translated address signals ADDRMF<0:n−1> to the memory module 32 in a preset order.

The memory module 32 may be a DIMM or a memory module having a 3D structure in which memory dies are stacked. The memory module 32 may include a plurality of memory chips CHIP0 to CHIPn−1 (321-1 to 321-n) and an address control circuit 322. The memory module 32 may perform input/output of data DQ with the memory controller 31 by accessing the plurality of memory chips 321-1 to 321-n in response to the command signal CMD and the plurality of translated address signals ADDRMF<0:n−1>. The plurality of memory chips 321-1 to 321-n may have substantially the same configuration. The plurality of memory chips 321-1 to 321-n may be configured to access corresponding row lines in response to the plurality of translated address signals ADDRMF<0:n−1> so that the first condition and the second condition are satisfied. The address control circuit 322 may be configured to distribute the plurality of translated address signals ADDRMF<0:n−1> to the plurality of memory chips 321-1 to 321-n, respectively, according to the sequence numbers of the plurality of translated address signals ADDRMF<0:n−1>. The address control circuit 322 may parallelize the plurality of translated address signals ADDRMF<0:n−1> in a serial form, and distribute the parallelized signals to the plurality of memory chips 321-1 to 321-n according to the sequence numbers of the parallelized signals. The address control circuit 322 may store and align the plurality of translated address signals ADDRMF<0:n−1>, which are provided in a serial form from the memory controller 31, to parallelize the plurality of translated address signals ADDRMF<0:n−1> in the form of the first translated address signal ADDRMF0 to the n−1$^{th}$ translated address signal ADDRMFn−1, and distribute the parallelized first translated address signal ADDRMF0 to n−1$^{th}$ translated address signal ADDRMFn−1 to the plurality of memory chips 321-1 to 321-n, respectively. For example, the address control circuit 322 may provide the first translated address signal ADDRMF0 to the first memory chip 321-1, provide the second translated address signal ADDRMF1 to the second memory chip 321-2, and, in this manner, provide the n−1$^{th}$ translated address signal ADDRMFn−1 to the n$^{th}$ memory chips 321-n.

Figure 9:
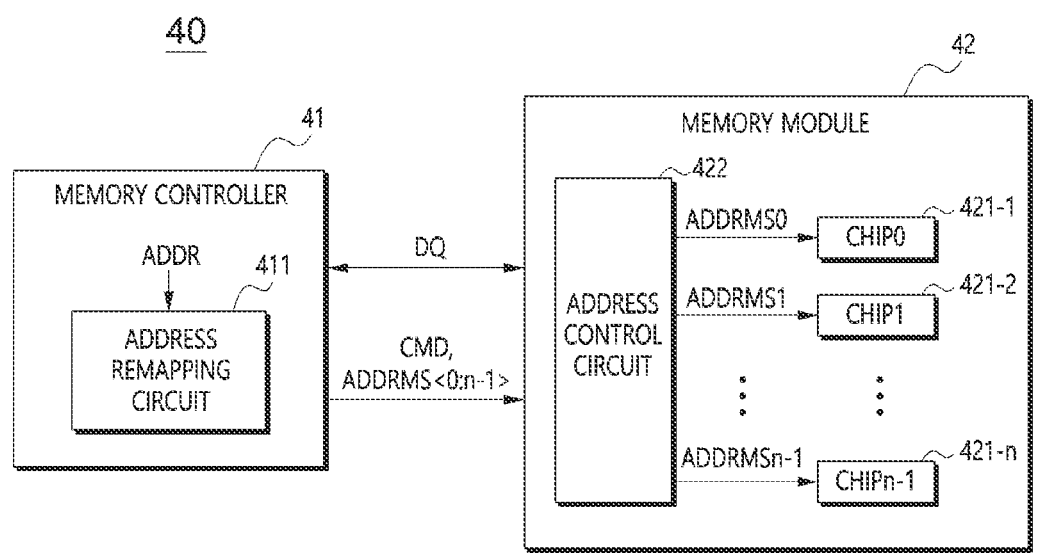
FIG. 9 is a diagram illustrating a configuration of a memory system 40 in accordance with yet another embodiment of the present disclosure.

FIG. 9 is a diagram illustrating a configuration of a memory system 40 in accordance with yet another embodiment of the present disclosure.

Referring to FIG. 9, the memory system 40 may include a memory controller 41 and a memory module 42.

The memory controller 41 may provide a command signal CMD and a plurality of translated address signals ADDRMS<0:n−1> to the memory module 42. The memory controller 41 may generate a target address signal ADDR by mapping a physical address signal, which is provided from an external host, for example, a CPU or a GPU, into a form suitable for memory access, and generate the plurality of translated address signals ADDRMS<0:n−1> by performing an address remapping operation on a row address signal and a bank address signal included in the target address signal ADDR. The target address signal ADDR may include address signals (for example, a row address signal, a column address signal, and a bank address signal) for selecting a row line, a column line, and a unit memory block of a semiconductor memory. The plurality of translated address signals ADDRMS<0:n−1> may include address signals, which are generated by performing an address remapping operation on the row address signal, the bank address signal, and the column address signal.

The memory controller 41 may include an address remapping circuit 411. The address remapping circuit 411 may generate the plurality of translated address signals ADDRMS<0:n−1> by performing an address remapping operation on the target address signal ADDR. The logic configuration of the address remapping circuit 411 may be substantially the same as the remapping logic of the address remapping circuit 210 described with reference to FIG. 6 and FIG. 7. The memory controller 41 may be configured to sequentially transmit the plurality of translated address signals ADDRMS<0:n−1> to the memory module 42 in a preset order.

The memory module 42 may be a DIMM or a memory module having a 3D structure in which memory dies are stacked. The memory module 42 may include a plurality of memory chips CHIP0 to CHIPn−1 (421-1 to 421-n) and an address control circuit 422. The memory module 42 may perform input/output of data DQ with the memory controller 41 by accessing the plurality of memory chips 421-1 to 421-n in response to the command signal CMD and the plurality of translated address signals ADDRMS<0:n−1>. The plurality of memory chips 421-1 to 421-n may have substantially the same configuration. The plurality of memory chips 421-1 to 421-n may be configured to access corresponding unit memory areas and corresponding row lines in response to the plurality of translated address signals ADDRMS<0:n−1> so that the first condition, the second condition, and the third condition are satisfied.

The address control circuit 422 may be configured to distribute the plurality of translated address signals ADDRMS<0:n−1> to the plurality of memory chips 421-1 to 421-n, respectively, according to the sequence numbers of the plurality of translated address signals ADDRMS<0:n−1>. The address control circuit 422 may parallelize the plurality of translated address signals ADDRMS<0:n−1>, and distribute the parallelized signals to the plurality of memory chips 421-1 to 421-n according to the sequence numbers of the parallelized signals. The address control circuit 422 may store and align the plurality of translated address signals ADDRMS<0:n−1>, which are provided in a serial form from the memory controller 41, to parallelize the plurality of translated address signals ADDRMS<0:n−1> in the form of the first translated address signal ADDRMS0 to the n−1$^{th}$ translated address signal ADDRMSn−1, and distribute the parallelized first translated address signal ADDRMS0 to n−1$^{th}$ translated address signal ADDRMSn−1 to the plurality of memory chips 421-1 to 421-n, respectively. For example, the address control circuit 422 may provide the first translated address signal ADDRMS0 to the first memory chip 421-1, provide the second translated address signal ADDRMS1 to the second memory chip 421-2, and, in this manner, provide the n−1$^{th}$ translated address signal ADDRMSn−1 to the n$^{th}$ memory chips 421-n.

Figure 10:
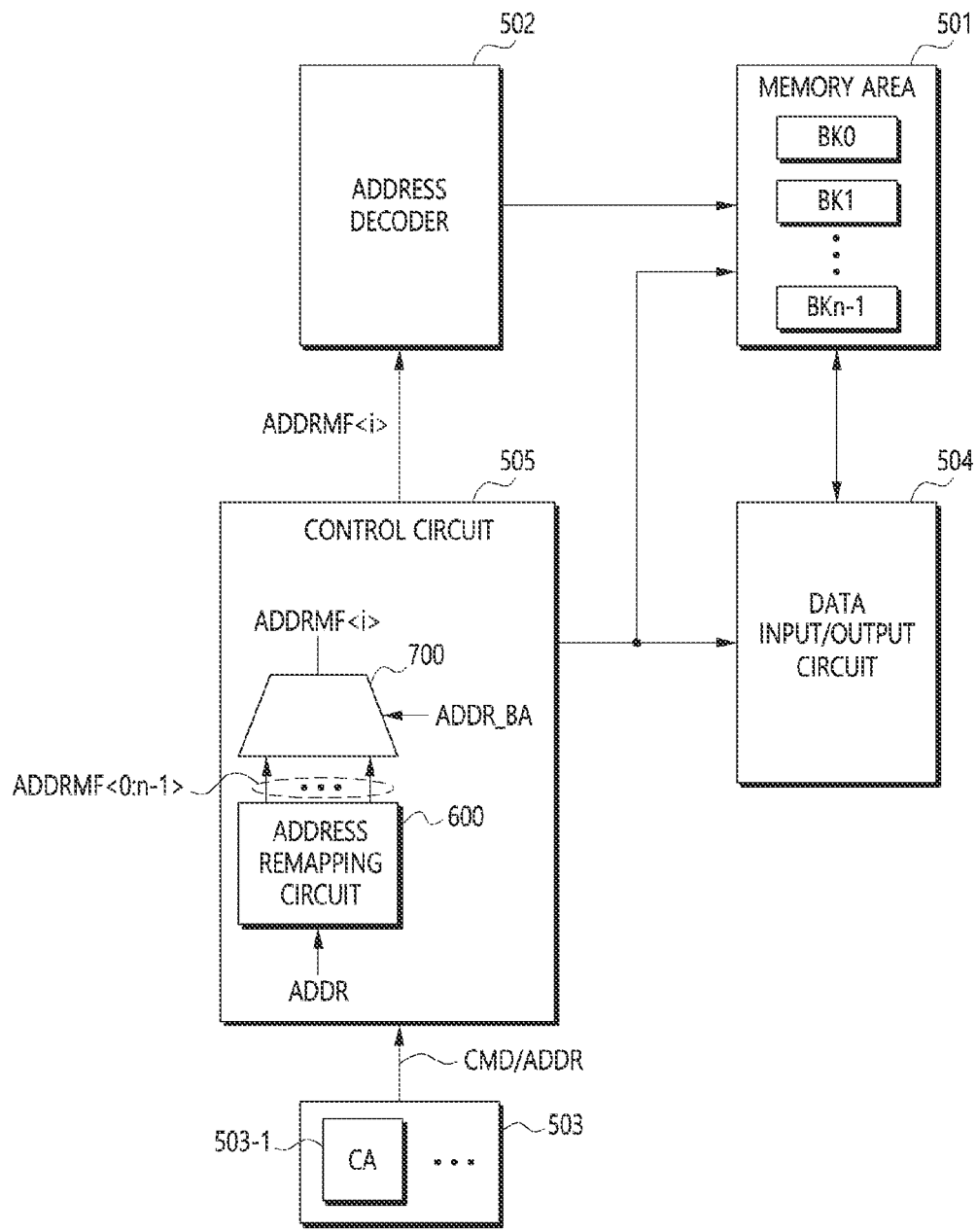
FIG. 10 is a diagram illustrating a configuration of a memory chip 500 in accordance with an embodiment of the present disclosure.

FIG. 10 is a diagram illustrating a configuration of a memory chip 500 in accordance with an embodiment of the present disclosure.

Referring to FIG. 10, the memory chip 500 may include a memory area 501, an address decoder 502, a pin array 503, a data input/output circuit 504, and a control circuit 505.

The memory area 501 may have substantially the same configuration as the memory area 101 of FIG. 3. The memory cells of the memory area 501 may be divided into a plurality of unit memory areas, for example, a plurality of memory banks BK0 to BKn−1.

The address decoder 502 may be connected to the control circuit 505 and the memory area 501. The address decoder 502 may decode a translated address signal ADDRMF<i> provided from the control circuit 505, and access the memory area 501 according to the decoding result.

The pin array 503 may include a command and address integration pin (CA) 503-1. The pin array 503 may have substantially the same configuration as the pin array 103 of FIG. 3.

The data input/output circuit 504 may be connected to the memory area 501. The data input/output circuit 504 may have substantially the same configuration as the data input/output circuit 104 of FIG. 3.

The control circuit 505 may be connected to the memory area 501, the address decoder 502, and the data input/output circuit 504. The control circuit 505 may perform a control operation related to the read operation, the write operation, and the address processing of the memory chip 500. The control circuit 505 may receive the command signal CMD and a target address signal ADDR through the command and address integration pin (CA) 503-1. The target address signal ADDR may be provided from a configuration outside the memory chip 500, for example, a memory controller. The target address signal ADDR may include address signals (for example, a row address signal, a column address signal, and a bank address signal) for selecting a row line, a column line, and a unit memory block of the memory area 501.

The control circuit 505 may generate a plurality of translated address signals ADDRMF<0:n−1> by remapping the row address signal included in the target address signal ADDR. The control circuit 505 may be configured to provide the address decoder 502 with any one translated address signal ADDRMF<i> corresponding to the sequence number of a memory bank corresponding to the bank address signal included in the target address signal ADDR, among the plurality of translated address signals ADDRMF<0:n−1>.

The control circuit 505 may include an address remapping circuit 600 and a multiplexing circuit 700. The address remapping circuit 600 may generate the plurality of translated address signals ADDRMF<0:n−1> by performing an address remapping operation on the row address signal included in the target address signal ADDR. The logic configuration of the address remapping circuit 600 may be substantially the same as the remapping logic of the address remapping circuit 110 described with reference to FIG. 2 and FIG. 4. The plurality of translated address signals ADDRMF<0:n−1> may include address signals, which are generated by performing an address remapping operation on the row address signal, the column address signal, and the bank address signal. The multiplexing circuit 700 may select one translated address signal ADDRMF<i> from the plurality of translated address signals ADDRMF<0:n−1> in response to a bank address signal ADDR_BA included in the target address signal ADDR, and output the selected translated address signal. For example, when the bank address signal ADDR_BA has a value corresponding to the second memory bank BK1 among the plurality of memory banks BK0 to BKn−1, the multiplexing circuit 700 may select the translated address signal ADDRMF1 from the plurality of translated address signals ADDRMF<0:n−1>, and output the selected translated address signal ADDRMF1.

In the aforementioned memory chip 500, even though row address signals included in each of different target address signals ADDR have substantially the same value, different row lines may be accessed for each of the plurality of memory banks BK0 to BKn−1. Consequently, in an embodiment, it is possible to minimize data loss caused by row hammer by satisfying the first condition that the sequence numbers of accessed row lines do not overlap each other and satisfying the second condition that the sequence numbers of victim rows, among accessed row lines, do not overlap those of adjacent memory chips.

A person skilled in the art to which the present disclosure pertains can understand that the present disclosure may be carried out in other specific forms without changing its technical spirit or essential features. Therefore, it should be understood that the embodiments described above are illustrative in all respects, not limitative. The scope of the present disclosure is defined by the claims to be described below rather than the detailed description, and it should be construed that the meaning and scope of the claims and all modifications or modified forms derived from the equivalent concept thereof are included in the scope of the present disclosure.

What is claimed is:

1. A memory module comprising:
   J memory chips configured to input and output (input/output) data in response to each of a plurality of translated address signals; and
   an address remapping circuit configured to generate a plurality of preliminary translated address signals by adding first correction bit values to a target address signal provided from a device external to the memory module, and to generate the plurality of translated address signals by shifting all bits of each of the plurality of preliminary translated address signals so that a group of K bits included in a bit string of each of the plurality of preliminary translated address signals are moved to a different position of each bit string,
   wherein J represents a number greater than 2, and
   wherein K represents a number greater than 2.

2. The memory module according to claim 1, wherein the address remapping circuit is configured to generate the plurality of preliminary translated address signals by adding the first correction bit values to a row address signal included in the target address signal.

3. The memory module according to claim 1, wherein K is determined using I and J, and wherein I is determined by total number of a currently accessed row line and row lines physically adjacent to the currently accessed row line and in which data loss of memory cells coupled to themselves occurs by activation of the currently accessed row line.

4. The memory module according to claim 1, wherein K is determined by a logarithm base 2 of the maximum of I and J, and I is determined by total number of a currently accessed row line and row lines physically adjacent to the currently accessed row line and in which data loss of memory cells coupled to themselves occurs by activation of the currently accessed row line.

5. A memory module comprising:
   J memory chips each including a plurality of unit memory areas and configured to input and output (input/output) data by accessing unit memory areas having sequence numbers, which do not overlap each other among the plurality of unit memory areas, in response to each of a plurality of translated address signals; and
   an address remapping circuit configured to generate a plurality of preliminary translated address signals by adding first correction bit values to a row address signal included in a target address signal provided from a device external to the memory module, to shift all bits of each of the plurality of preliminary translated address signals so that a group of K bits included in a bit string of each of the plurality of preliminary translated address signals are moved to a different position of each bit string, and to generate the plurality of translated address signals by adding second correction bit values to a unit area address included in the target address signal,
   wherein J represents a number greater than 2, and
   wherein K represents a number greater than 2.

6. The memory module according to claim 5, wherein the first correction bit values and the second correction bit values are the same.

7. The memory module according to claim 5, wherein K is determined using I and J, wherein I is determined by total number of a currently accessed row line and row lines physically adjacent to the currently accessed row line and in which data loss of memory cells coupled to themselves occurs by activation of the currently accessed row line.

8. The memory module according to claim 5, wherein K is determined by logarithm base 2 of the maximum of I and J, and I is determined by total number of a currently accessed row line and row lines physically adjacent to the currently accessed row line and in which data loss of memory cells coupled to themselves occurs by activation of the currently accessed row line.

9. A memory system comprising:
a memory controller configured to generate a plurality of preliminary translated address signals by adding correction bit values to a target address signal, and to generate a plurality of translated address signals by shifting all bits of each of the plurality of preliminary translated address signals so that a group of K bits included in a bit string of each of the plurality of preliminary translated address signals are moved to a different position of each bit string; and
a memory module including J memory chips, configured to receive the plurality of translated address signals, and configured so that the J memory chips perform data input and output (input/output) with the memory controller in response to each of the plurality of translated address signals,
wherein J represents a number greater than 2, and
wherein K represents a number greater than 2.

10. The memory system according to claim 9, wherein the memory controller includes an address remapping circuit,
wherein the address remapping circuit is configured to generate the plurality of preliminary translated address signals by adding the correction bit values to a row address signal included in the target address signal.

11. The memory system according to claim 9, wherein K is determined by a logarithm base 2 of the maximum of I and J, and I is determined by total number of a currently accessed row line and row lines physically adjacent to the currently accessed row line and in which data loss of memory cells coupled to themselves occurs by activation of the currently accessed row line.

12. The memory system according to claim 9, wherein the memory module includes an address control circuit,
wherein the address control circuit is configured to distribute the plurality of translated address signals to the J memory chips according to sequence numbers of the plurality of translated address signals.

13. A memory system comprising:
a memory controller configured to generate a plurality of preliminary translated address signals by adding first correction bit values to a row address signal included in a target address signal, to shift all bits of each of the plurality of preliminary translated address signals so that a group of K bits included in a bit string of each of the plurality of preliminary translated address signals are moved to a different position of each bit string, and to generate the plurality of translated address signals by adding second correction bit values to a unit area address included in the target address signal; and
a memory module including J memory chips each including a plurality of unit memory areas, and configured so that the J memory chips perform data input and output (input/output) with the memory controller by accessing unit memory areas having sequence numbers, which do not overlap each other among the plurality of unit memory areas, in response to each of the plurality of translated address signals,
wherein J represents a number greater than 2, and
wherein K represents a number greater than 2.

14. The memory system according to claim 13, wherein K is determined by logarithm base 2 of the maximum of I and J, and I is determined by total number of a currently accessed row line and row lines physically adjacent to the currently accessed row line and in which data loss of memory cells coupled to themselves occurs by activation of the currently accessed row line.

15. The memory system according to claim 13, wherein the memory module includes an address control circuit,
wherein the address control circuit is configured to distribute the plurality of translated address signals to the J memory chips according to sequence numbers of the plurality of translated address signals.

16. A semiconductor memory apparatus comprising:
a memory area including J unit memory areas;
an address remapping circuit configured to generate a plurality of preliminary translated address signals by adding first correction bit values to a row address signal included in the target address signal, and to generate the plurality of translated address signals by shifting all bits of each of the plurality of preliminary translated address signals so that K bits included in a bit string of each of the plurality of preliminary translated address signals are moved to other positions of each bit string;
a multiplexing circuit configured to select any one of the plurality of translated address signals in response to a bank address signal included in the target address signal, and to output the selected signal; and
an address decoder configured to decode the any one translated address signal and access the memory area according to a decoding result,
wherein J represents a number greater than 2, and wherein K represents a natural number greater than 2.

17. The semiconductor memory apparatus according to claim 16, wherein K is determined by a logarithm base 2 of the maximum of I and J and I is determined by total number of a currently accessed row line and row lines physically adjacent to the currently accessed row line and in which data loss of memory cells coupled to themselves occurs by activation of the currently accessed row line.

* * * * *